US008331214B2

(12) United States Patent
Fukushima et al.

(10) Patent No.: US 8,331,214 B2
(45) Date of Patent: Dec. 11, 2012

(54) OPTICAL RECORDING MEDIUM CAPABLE OF INCREASING THE NUMBER OF WOBBLE ADDRESS BITS AND METHOD FOR RECORDING AND REPRODUCING THEREOF

(75) Inventors: Akio Fukushima, Yokohama (JP); Masakazu Ikeda, Odawara (JP); Koichi Hirose, Yokohama (JP); Koichiro Nishimura, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 325 days.

(21) Appl. No.: 12/629,475

(22) Filed: Dec. 2, 2009

(65) Prior Publication Data
US 2010/0214898 A1 Aug. 26, 2010

(30) Foreign Application Priority Data

Feb. 24, 2009 (JP) ................................ 2009-040139

(51) Int. Cl.
*G11B 7/24* (2006.01)
(52) U.S. Cl. ................ 369/275.4; 369/275.3; 369/30.18
(58) Field of Classification Search ............... 369/275.3, 369/275.2, 275.1, 275.4, 47.2–47.23, 53.2, 369/53, 53.24, 53.41
See application file for complete search history.

(56) References Cited

U.S. PATENT DOCUMENTS

| | | | | |
|---|---|---|---|---|
| 7,257,075 B2* | 8/2007 | Kim et al. | ................... | 369/275.3 |
| 7,266,075 B2* | 9/2007 | Kim et al. | ................... | 369/275.3 |
| 7,525,889 B2* | 4/2009 | Kim et al. | ................... | 369/53.24 |
| 7,542,393 B2* | 6/2009 | Kim et al. | ................... | 369/53.24 |
| 2002/0159340 A1 | 10/2002 | Nanba | | |
| 2004/0184393 A1* | 9/2004 | Kim et al. | ................... | 369/275.3 |
| 2004/0264694 A1 | 12/2004 | Kim et al. | | |
| 2005/0163004 A1 | 7/2005 | Suzuki | | |
| 2006/0101283 A1* | 5/2006 | Kim et al. | ...................... | 713/189 |
| 2010/0202276 A1* | 8/2010 | Ikeda et al. | ................ | 369/275.3 |
| 2010/0214885 A1* | 8/2010 | Ikeda et al. | ................ | 369/30.01 |

FOREIGN PATENT DOCUMENTS

| | | |
|---|---|---|
| CN | 101073110 A | 11/2007 |
| EP | 2 219 189 A1 | 8/2010 |
| JP | 2008-041243 | 2/2008 |
| WO | WO 2006/061727 A1 | 6/2006 |

OTHER PUBLICATIONS

Chinese Office Action, with English translation, issued in Chinese Patent Application No. 200910211643, dated Jun. 23, 2011.
European Office Action issued in European Patent Application No. 09178196.3, dated Aug. 1, 2011.
European Office Action issued in European Patent Application No. 09178196.3-2210, dated Apr. 14, 2010.

* cited by examiner

Primary Examiner — Tan X Dinh
(74) *Attorney, Agent, or Firm* — McDermott Will & Emery LLP

(57) ABSTRACT

In a recording medium, an extension address is obtained without changing the number of bits of the address embedded in the wobble. The wobble address is partially or wholly encoded to embed the address information. At the time of reproducing the address information, the original address information is obtained by restoring the embedded information by the decoding process.

6 Claims, 13 Drawing Sheets

| Encode | | | | Decode | | | | |
|---|---|---|---|---|---|---|---|---|
| AA2 | AA1 | AA0 | AA2..AA0 | AW1(=AA2) | AW0(=AA0) | AW1..AW0 | AA1' | STATE |
| 0 | 0 | 0 | 0 | 0 | 0 | 0 | 0 | (1) |
| 0 | 0 | 1 | 1 | 0 | 1 | 1 | 0 | (2) |
| 0 | 1 | 0 | 2 | 0 | 0 | 0 | 1 | (3) |
| 0 | 1 | 1 | 3 | 0 | 1 | 1 | 1 | - |
| 1 | 0 | 0 | 4 | 1 | 0 | 2 | 0 | (4) |
| 1 | 0 | 1 | 5 | 1 | 1 | 3 | 0 | (5) |
| 1 | 1 | 0 | 6 | 1 | 0 | 2 | 1 | (6) |
| 1 | 1 | 1 | 7 | 1 | 1 | 3 | 1 | - |

STATE TRANSITION

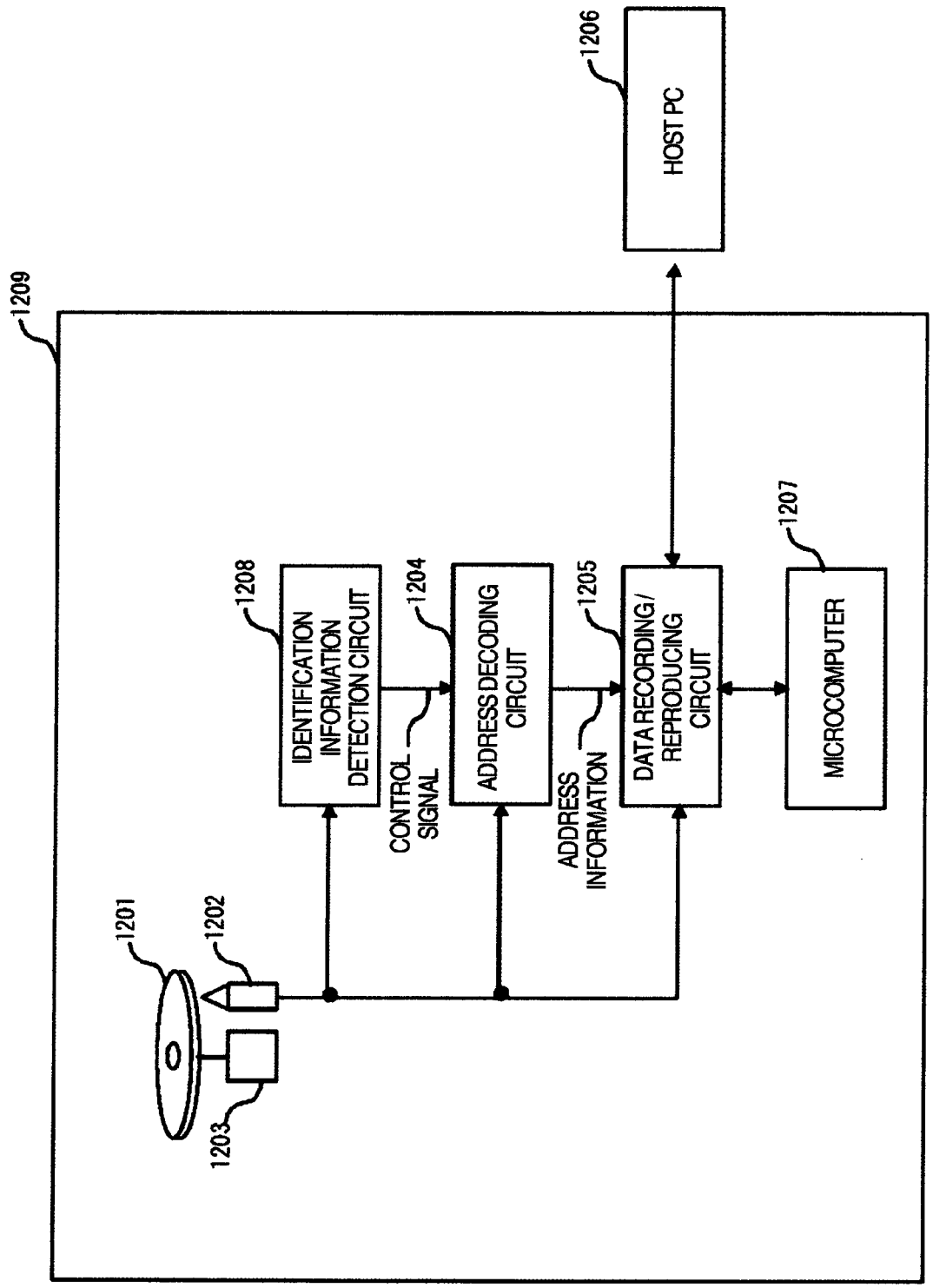

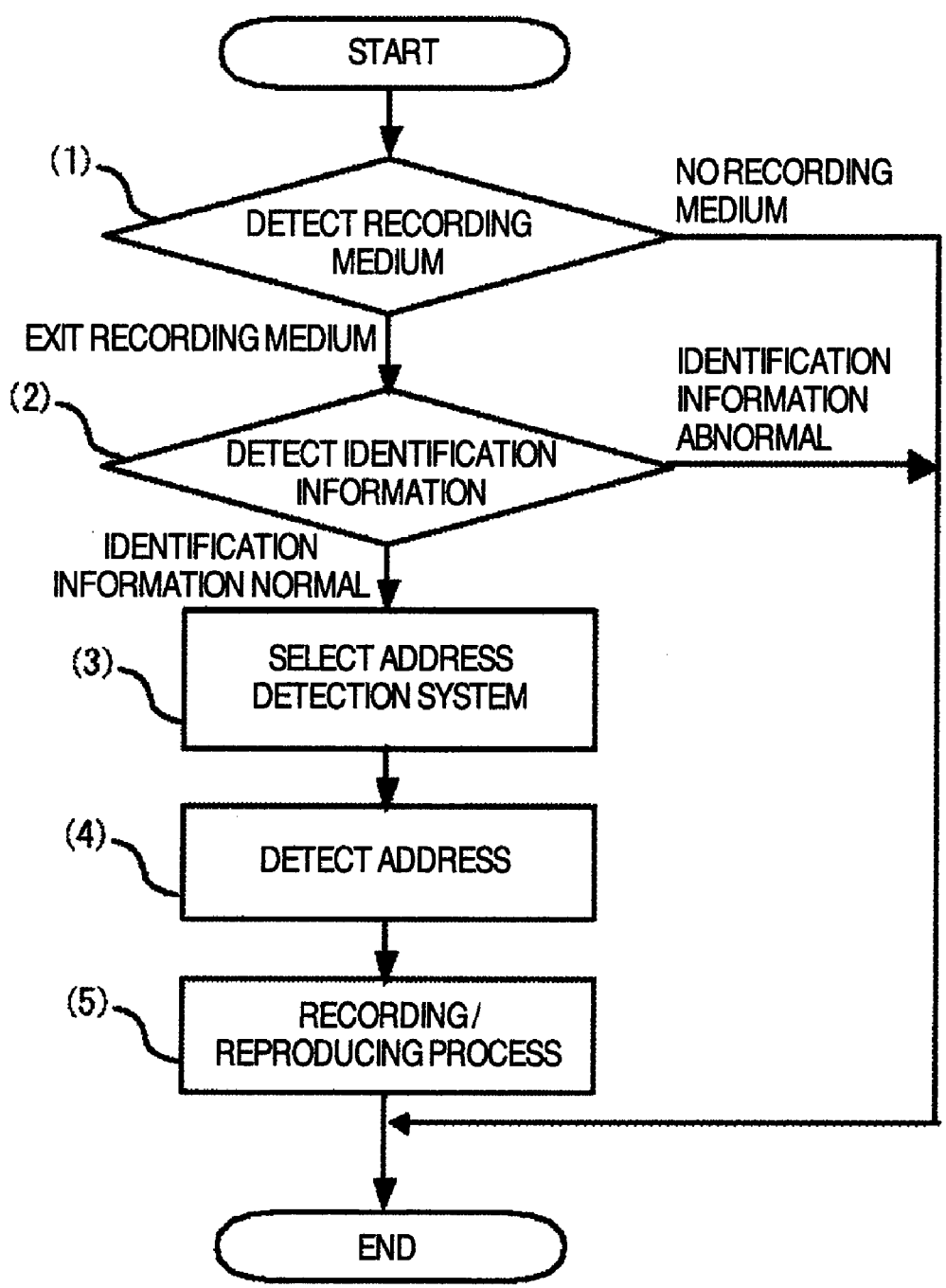

OPTICAL RECORDING MEDIUM CAPABLE OF INCREASING THE NUMBER OF WOBBLE ADDRESS BITS AND METHOD FOR RECORDING AND REPRODUCING THEREOF

INCORPORATION BY REFERENCE

The present application claims priority from Japanese application JP 2009-040139 filed on Feb. 24, 2009, the content of which is hereby incorporated by reference into this application.

BACKGROUND OF THE INVENTION

1. Field of the Invention

This invention relates to an information recording medium such as an optical disc having addresses recorded therein, an address generation method and an address detection method for the information recording medium, a recording apparatus for recording the data in the information recording medium, and a reproducing apparatus for reproducing the data from the information recording medium.

2. Description of the Related Art

The correlation of the address information of Blu-ray Disc is shown in FIG. 6 of JP-A-2008-41243. Paragraph [0010] of this reference contains the description that "The address unit number (AUN: Address Unit Number), as shown in FIG. 6, is associated with the physical sector number and the physical ADIP (Address In Pre-groove) address, and therefore, used effectively as reference information to search for the recording position." FIG. 6 of the same reference shows that the physical sector number (PSN) with one address thereof allocated to a data as a sector unit and the physical ADIP address (PAA) embedded in a wobble hold the relationship defined as "32*PSN=3*PAA". However, the five bits from bits 31 to 27 of PSN are not assigned to the corresponding PAA bit position.

In the case where the recording capacity increases, it is insufficient for the data amount expressed by the conventional length of 27 PSN bits shown in JP-A-2008-41243, the number of the PAA bits embedded in the wobble runs short. In the case where the number of PAA bits increases to keep up with the increase in the recording capacity according to the normal method, on the other hand, the wobble address structure is required to be reconstructed greatly.

SUMMARY OF THE INVENTION

A first object of this invention is to provide a recording medium capable of increasing the number of wobble address bits equivalently without great reconstruction of the wobble structure, an address generation and detection method and reproducing and recording apparatuses.

A second object of the invention is to provide a reproducing and recording apparatus compatible with the conventional recording medium and a novel recording medium proposed by the present invention.

This invention is intended to achieve the first and second objects described above.

In order to solve the problem and to realize the first object described above, the PSN recording area is increased by using a part of the area of the wobble address conventionally embedding the information other than PSN. Also, with regard to the information other than PSN conventionally recorded in a given area but now incapable of being recorded in the particular area due to the increased PSN recording area, the information equivalent to the particular information is embedded by encoding at the time of recording, and the particular information is restored by decoding and used at the time of reproduction.

Also, in order to solve the problem and to realize the second object described above, the conventional recording medium and the novel recording medium are identified, and in accordance with the result thereof, the encoding and decoding process of the wobble address bits are changed to a suitable recording medium to generate and detect the address for recording or reproducing the information.

According to this invention, the number of the wobble address bits, i.e. the PSN recording area can be increased without considerably changing the bit structure of the conventional wobble address structure.

BRIEF DESCRIPTION OF THE DRAWINGS

FIG. 13 is a block diagram showing a recording/reproducing apparatus according to a third embodiment of the invention.

FIG. 14 is a flowchart showing the address detection process for a recording/reproducing apparatus according to the third embodiment of the invention.

DETAILED DESCRIPTION OF THE INVENTION

Embodiments of the invention are described below with reference to the accompanying drawings.

First, an embodiment for achieving the first object is explained.

Figure 1:
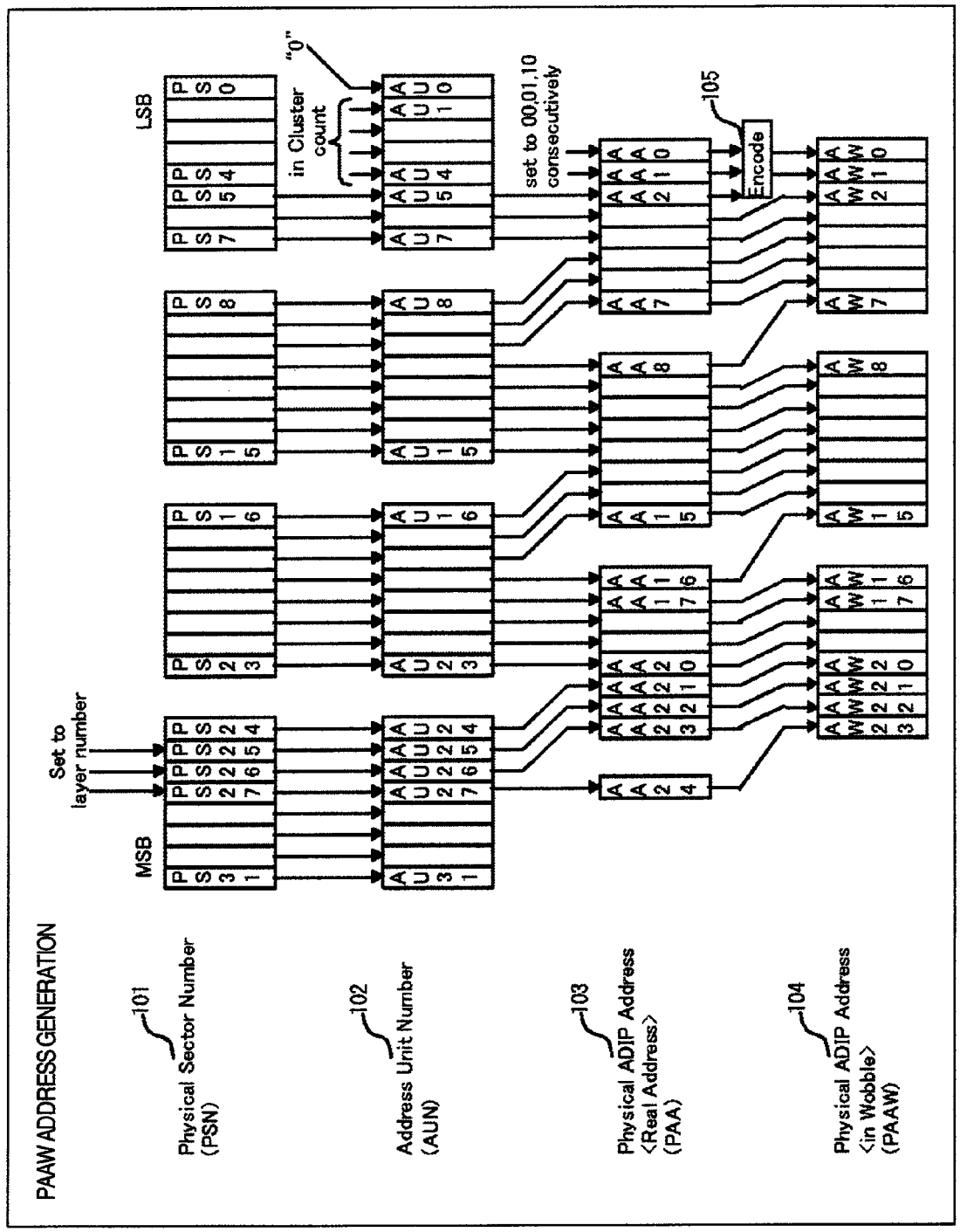
FIG. 1 is a diagram showing the correlation of the addresses of an optical disc according to a first embodiment of the invention.

FIG. 1 is a correlation diagram showing the addresses of a multilayer optical disc according to a first embodiment of the invention. Reference numeral 101 designates a physical sector number (PSN) of a physical sector, numeral 102 an address unit number (AUN) constituting an address embedded in the data of each cluster, numeral 103 a real address of the physical ADIP address (PAA) constituting the physical ADIP address, numeral 104 the address (PAAW) actually embedded in the wobble among the physical ADIP addresses, numeral 105 the encoding process, and numeral 106 the decoding process.

This embodiment shows a case in which the most significant three bits (AA24 to AA22) of the PAA 103 are assigned with the layer number bits, and the conventional PAA configured of 24 bits (AA23 to AA0) are extended 1 bit of AA24 as an address. Incidentally, FIG. 1 and subsequent diagrams include a part lacking the bit number of each signal. Such a number can be determined by following the order from the adjacent known numbers, and therefore, not described.

The conventional configuration and the configuration according to the invention are explained by comparing them with each other.

In the conventional PAA constructed of 24 bits (AA23 to AA0), the 3-bit layer number is assigned to AA23 to AA21, the 19-bit cluster number is assigned to AA20 to AA2, and the 2-bit in-cluster count value is assigned to AA1 to AA0. In this case, the address can be assigned to the layer information adapted for a maximum of eight layered disc of the layer numbers 7 to 0 with the 3-bit layer number and the data of the data capacity of 32 gigabytes (64 Kbytes$\times 2^{19}$) per layer with the 19-bit cluster number.

Now, assuming that an arrangement shown in the embodiment applies to a large-capacity optical disc of more than 32 gigabytes but less than 64 gigabytes per layer. In this case, 19 bits are not sufficient for the cluster number. By increasing the conventional 19-bit cluster to 20 bits, the address can be assigned to the data of the data capacity of 64 gigabytes (64 Kbytes$\times 2^{20}$) per layer.

In this case, however, the conventional 24-bit PAA (AA23 to AA0) necessitates the reduction of one other bit as the result of increasing one cluster bit. In the case where the number of bits of the layer number is reduced from three to two bits, however, the address of 5 layers or more cannot be designated. Therefore, the number of bits of the layer number is set to 3 bits as in the prior art, and alternatively, the number of bits corresponding to the 2-bit in-cluster count (AA1 to AA0) is reduced to one bit of only AA0.

A method of generating the addresses shown in FIG. 1 is explained below. In the PSN, the most significant four bits (PS31 to PS28) are not used for address generation, and the address range of the least significant 28 bits (PS27 to PS0) is assigned with the PAA of 25 bits (AA24 to AA0) as an address range on the wobble.

Also, the number of PAA corresponding to one cluster is three, and therefore, according to the prior art, a pattern with (AA1, AA0) in the order of (0,0)→(0,1)→(1,0)→(0,0)→(0,1)→(1,0) (the order of 0→1→2→0→1→2 in numerical value) in such a manner that the least significant two bits (AA1 to AA0) of PAA indicate the number of PAA in one cluster.

According to this invention, on the other hand, the number of PAA bits is increased by one as described above, the number of bits corresponding to the 2-bit (AA1 to AA0) in-cluster count in the prior art is reduced by one bit to AA0 alone. In order to be informed of the number of PAA in one cluster as in the prior art only with the AA0 information, therefore, the information equivalent to AA1 and AA0 is embedded in PAAW (AW0) by the encoding process 105 at the time of recording, and at the time of reproduction, the information equivalent to AA1 and AA0 is restored by the decoding process 106.

Next, the encoding process 105 and the decoding process 106 are explained with reference to the drawings.

Figure 2:
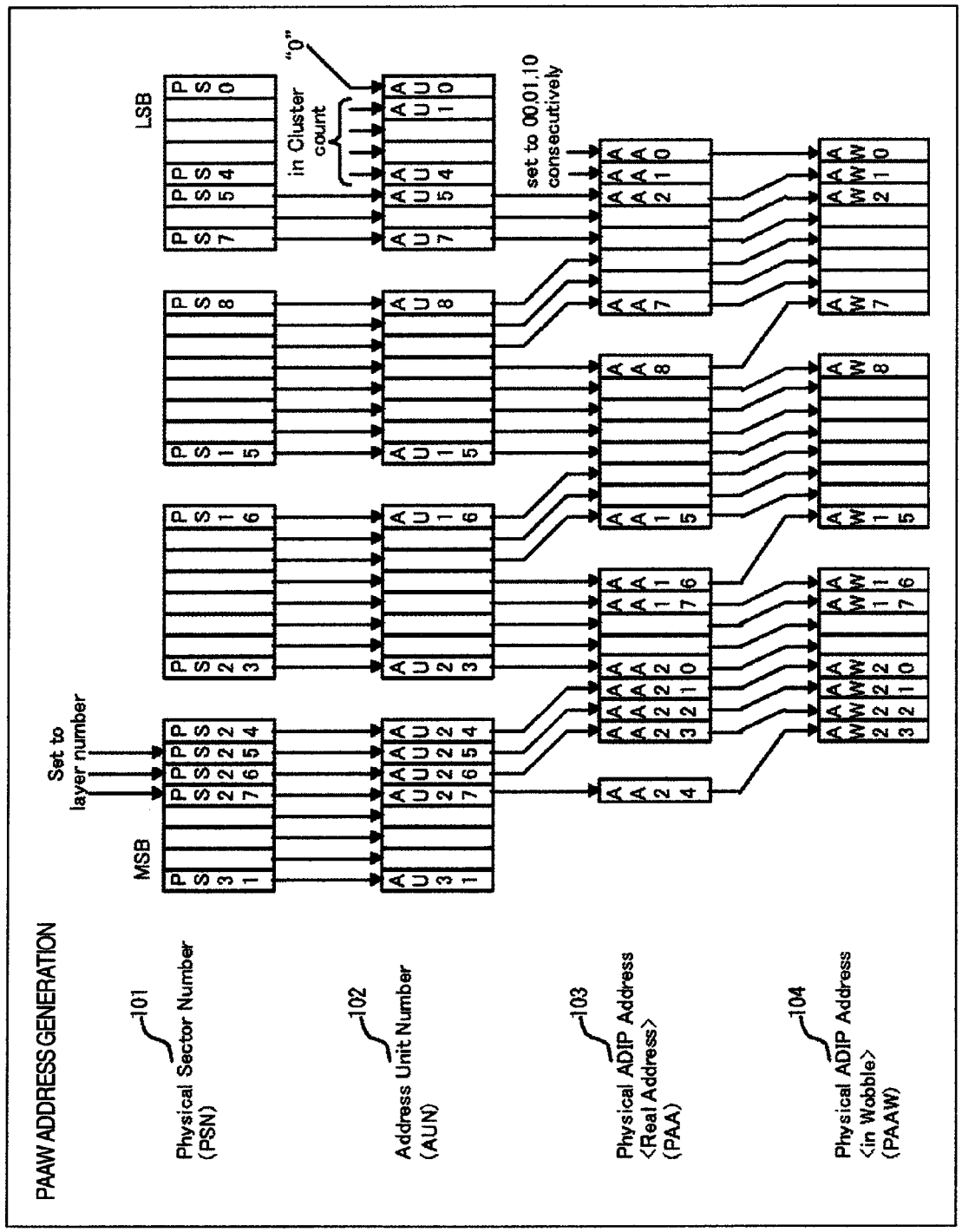
FIG. 2 is a correlation diagram showing an example of the address encoding method for an optical disc according to the first embodiment of the invention.

FIG. 2 shows an example of the encoding process. In generating outputs AW1, AW0 from inputs AA2, AA1, AA0, AW1 is set to AA2 and AW0 to AA0, with the value of AA1 not related to AW1, AW0.

Figure 3:
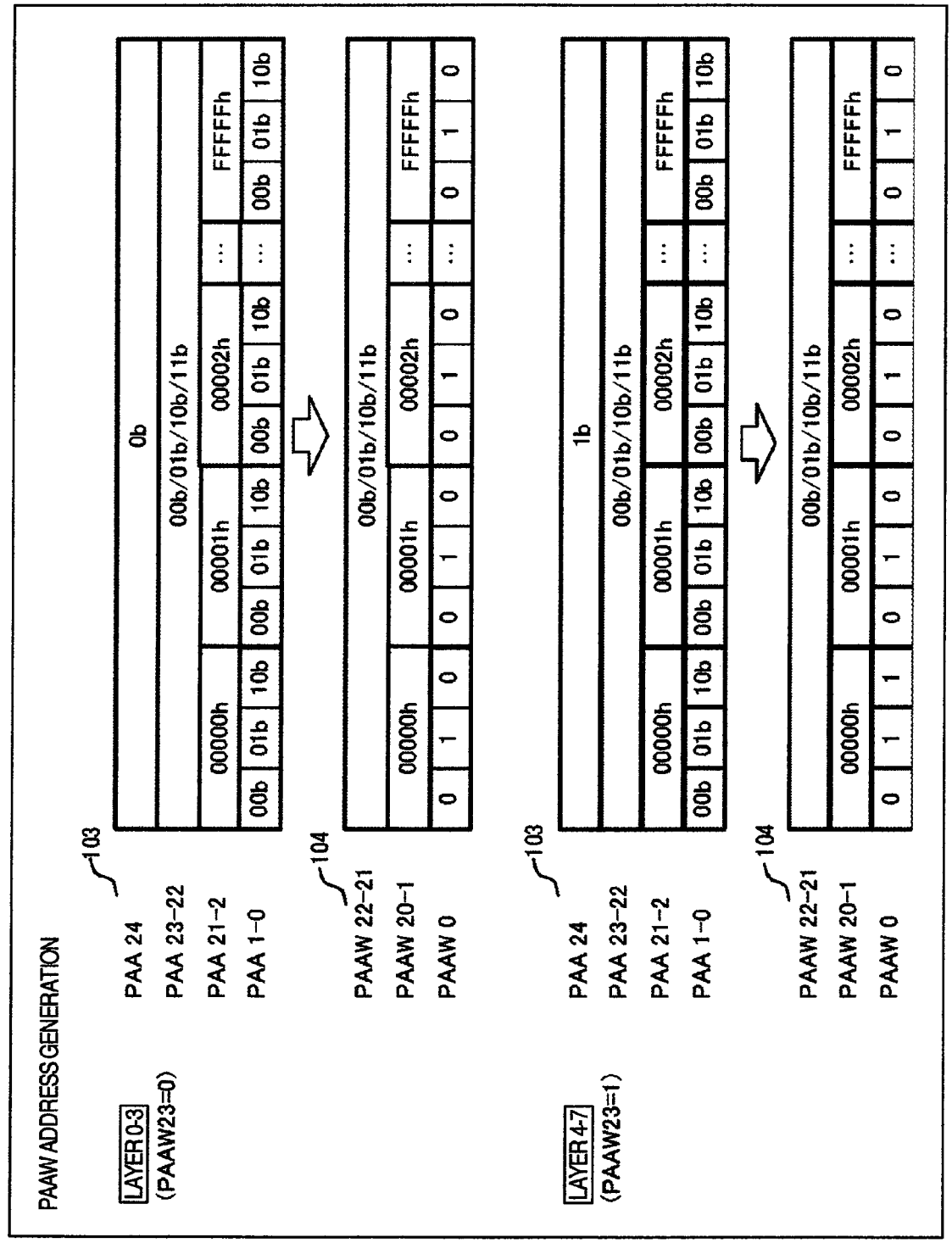
FIG. 3 is a diagram showing an example of the value at the time of address encoding for an optical disc according to the first embodiment of the invention.

FIG. 3 shows an example of the relation between PAA and PAAW in the encoding process 105 shown in FIG. 2.

Figure 4:
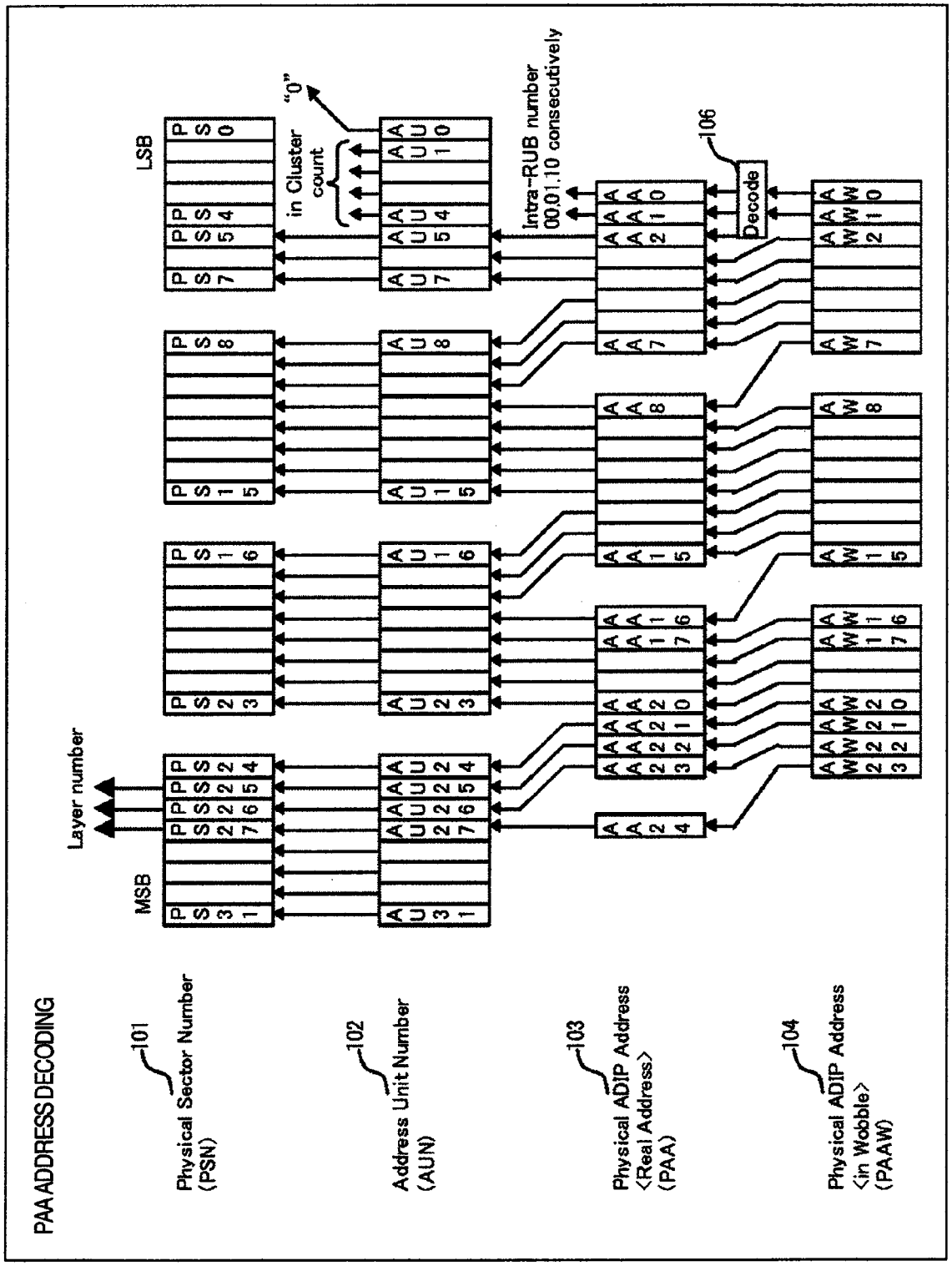
FIG. 4 is a correlation diagram showing an example of the address decoding method for an optical disc according to the first embodiment of the invention.

FIG. 4 shows the decoding operation corresponding to the encoding operation shown in FIG. 2.

Figure 5:
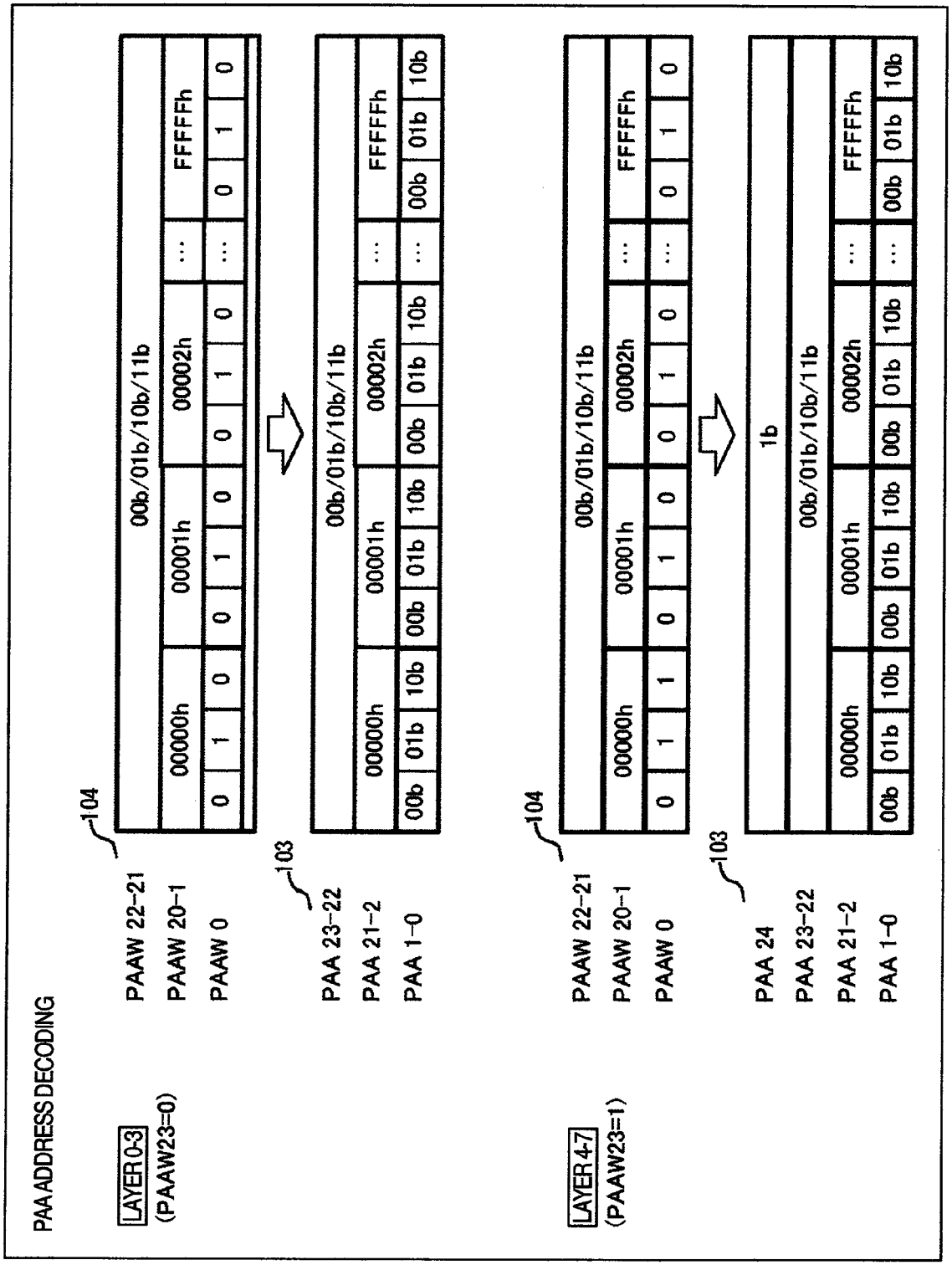
FIG. 5 is a diagram showing an example of the value at the time of address decoding for an optical disc according to the first embodiment of the invention.

FIG. 5 shows an example of the relation between PAA and PAAW in the decoding process 106.

The decoding process 106 is explained in detail.

Figures 6, 7:
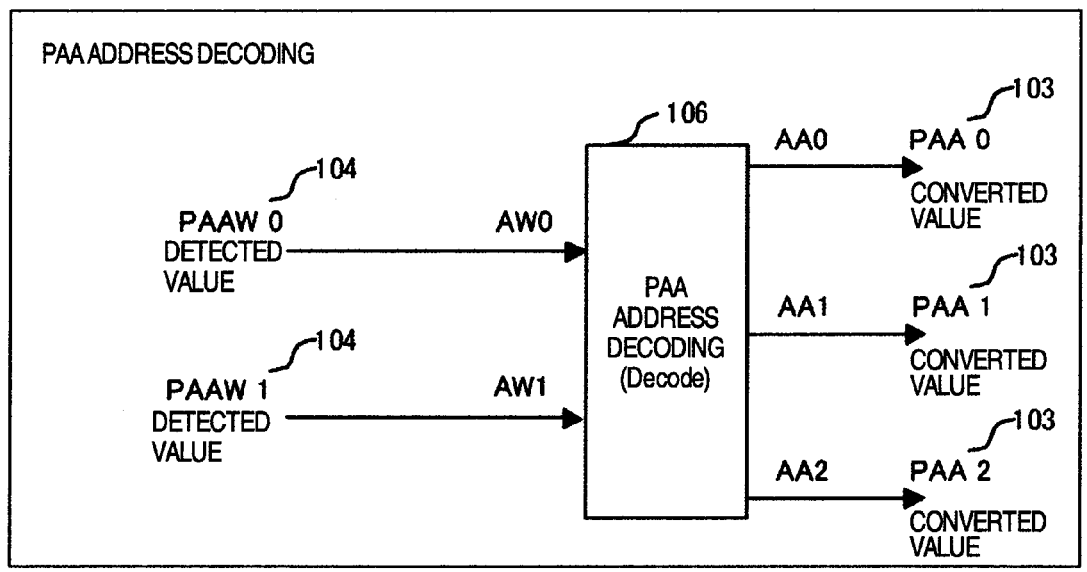
FIG. 6 is a diagram showing the input/output data for the address decoding process in an optical disc according to the first embodiment of the invention.
FIG. 7 is a diagram showing an example of the value of the input/output data for the address decoding process in an optical disc according to the first embodiment of the invention.

FIG. 6 shows an extract of the decoding process portion directly related to the decoding process 106.

FIG. 7 shows an example of the values of the input and output signals at the time of the encoding and decoding operation shown in FIG. 6. Incidentally, the two cases in which (AA2, AA1, AA0)=(0, 1, 1), (1, 1, 1) are nonexistent for the reason described above, and therefore, the encoder can assume the six states (1) to (6). Of all the data for encoding, AA1 is absent in PAAW, and therefore, AA1' equivalent to AA1 is restored from AW1 (=AA2) and AW0 (=AA0) at the time of decoding.

Figure 8:
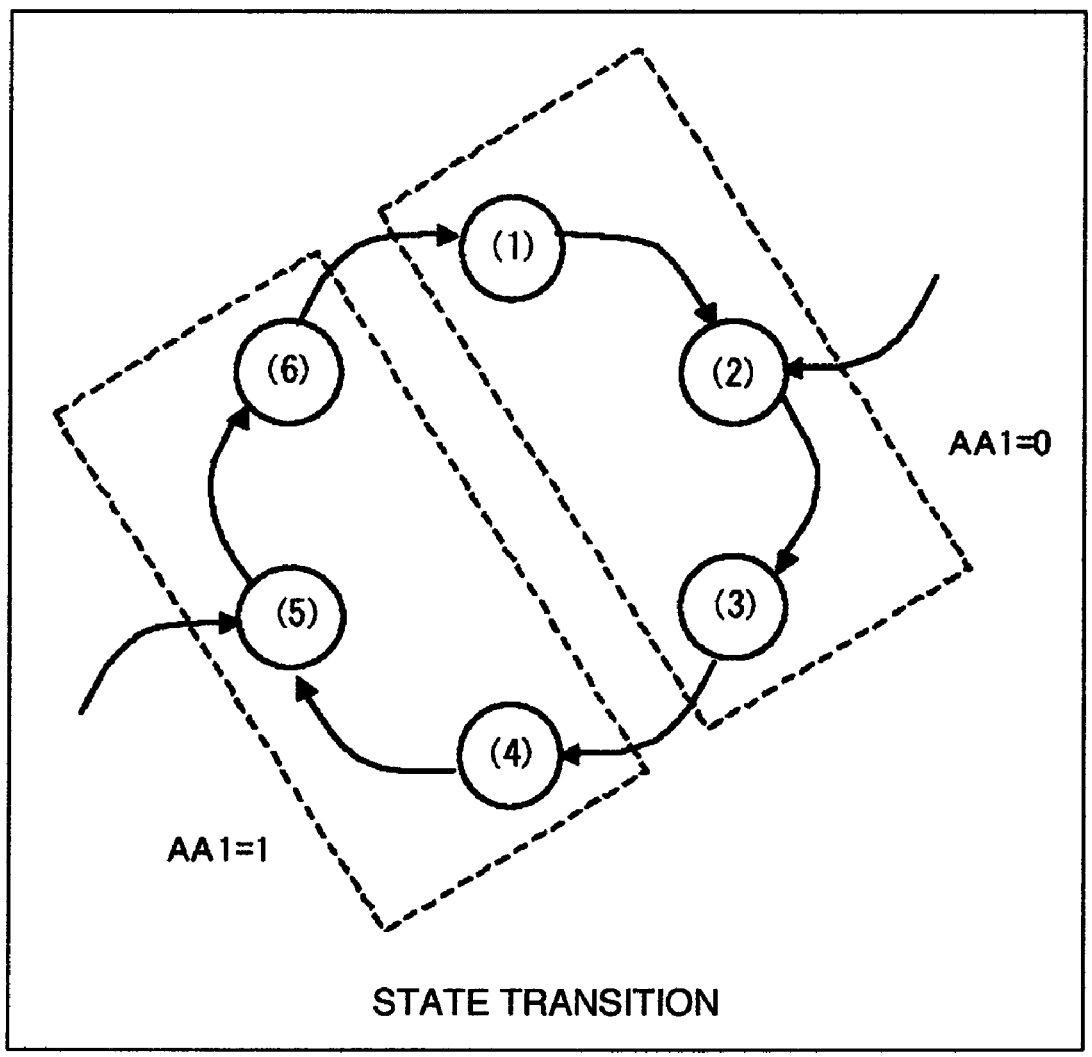
FIG. 8 is a diagram showing the state transition for the address decoding process in an optical disc according to the first embodiment of the invention.

FIG. 8 shows the state transition between the states that the encoder can assume. As a method of detecting a wobble address, an address is generated by continuous detection for protection taking a detection error and a detection failure into consideration. In this case, the continuity of the least significant address of PAAW bits 1 and 0 is checked. For this purpose, first, the unique state (2) or (5) is detected out of the states (1) to (6), and then, and the state transition in normal sequence from the state (2) or (5) is confirmed under appropriate conditions. As a result, after confirming the normal state transition, the decoding operation can be realized as AA1=0 for the states (1), (2) and (3), and AA1=1 for the states (4), (5) and (6). Incidentally, the appropriate conditions for confirming the state transition in normal sequence are, for example, the state transition carried out a predetermined number of times in normal sequence.

Next, an embodiment for achieving the second object of the invention is explained.

An optical disc is assumed as an information recording medium. Generally, even in the case where an optical disc of a new standard is placed on the market, the demand does not always change from the optical disc of the conventional standard to the optical disc of the new standard in view of the cost and availability of the optical disc and the compatibility with the conventional recording/reproducing apparatuses. Also, the optical disc of the conventional standard continues to be used to reproduce and rewrite the information recorded therein. As a result, it is the common practice to use the recording apparatus or the reproduction apparatus of the optical disc of the new standard while at the same time maintaining the compatibility with the optical disc of the conventional standard.

In the apparatus used with the novel address system according to the invention described in the first embodiment, therefore, the compatibility with the conventional address system is desirably maintained. In view of this, according to this embodiment, both the new address system applicable to a large-capacity optical disc of more than 32 gigabytes but less than 64 gigabytes per layer according to the invention and the conventional address system applicable to a large-capacity optical disc of up to 32 gigabits per layer are made available in switchable form.

Figure 9:
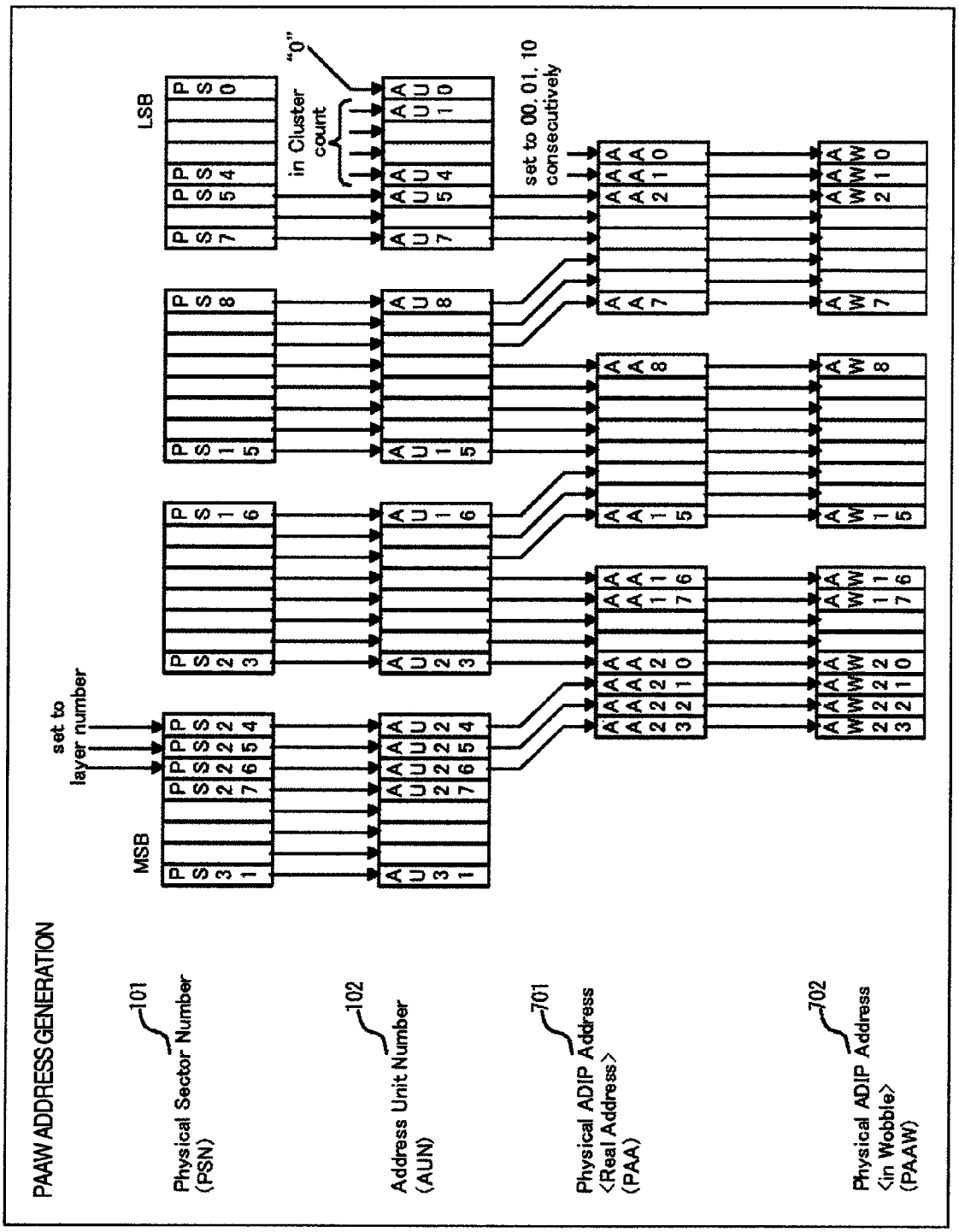
FIG. 9 is a correlation diagram for encoding the address of the conventional optical disc.

FIG. 9 shows a case in which the PAAW address is generated in assigning the address to the data having the data capacity of 32 gigabytes (64 Kbytes×$2^{19}$) per layer according to the 19-bit cluster number explained as the state before address extension in the first embodiment. In this 24-bit PAA (AA23 to AA0), the 3-bit layer number is assigned with AA23 to AA21, the 19-bit cluster number with AA20 to AA2, and the 2-bit in-cluster count value with AA1 to AA0. Thus, the address can be assigned to the layer information usable for a disc with a maximum of 8 layers of 3-bit layer numbers 7 to 0 and the data having the data capacity of 32 gigabytes (64 Kbytes×$2^{19}$) per layer according to the 19-bit cluster number.

Figure 10:
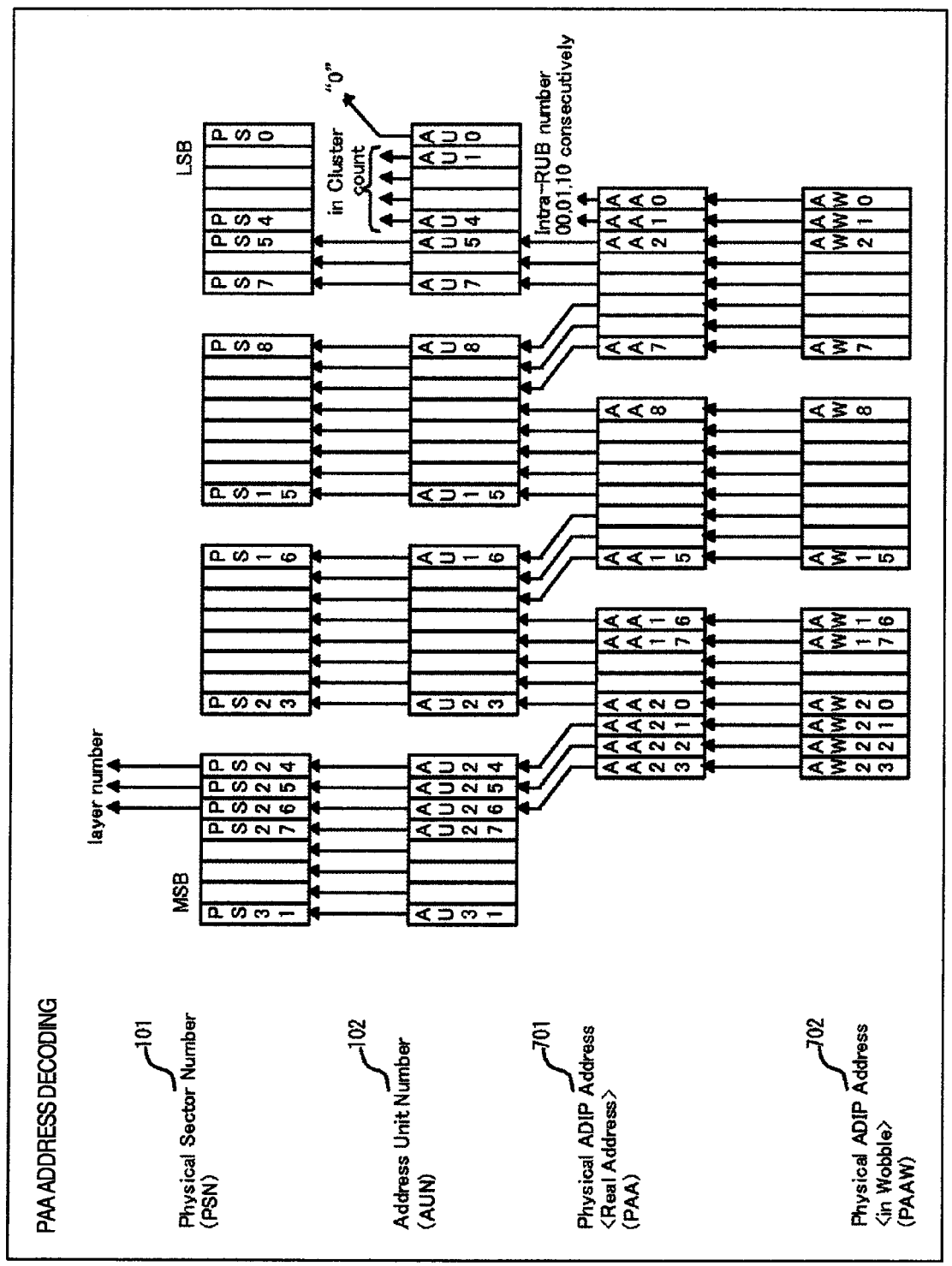
FIG. 10 is a correlation diagram for decoding the address of the conventional optical disc.

FIG. 10 shows the PAA address decoding process in the case where the address is assigned to the data 32 gigabytes (64 Kbytes×$2^{19}$) in capacity per layer using the 19-bit cluster number, as explained in the first embodiment above as the state before address extension.

As explained in the first embodiment, the address system according to this invention is shown, with the PAAW address generated in FIG. 1 and with the PAA address decoded in FIG. 4. This embodiment, therefore, uses a control signal for selection by switching between the conventional address system shown in FIGS. 9, 10 and the address system according to the invention shown in FIGS. 1, 4, and a selector controlled by the control signal.

Figure 11:
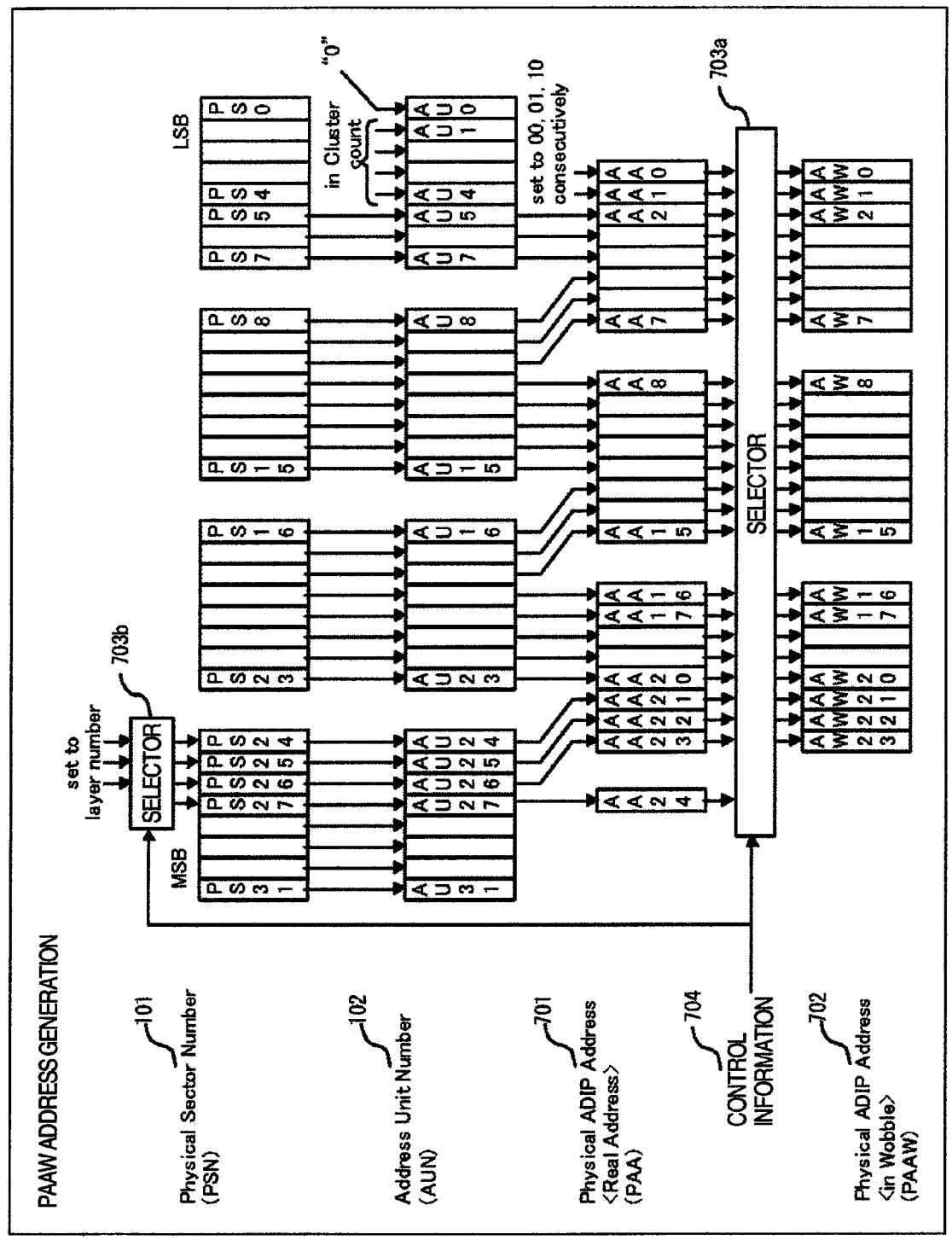
FIG. 11 is an address correlation diagram showing a case in which the address encoding method for the optical disc according to the second embodiment of the invention and the address encoding method for the conventional optical disc are selectively switched.
Figure 12:
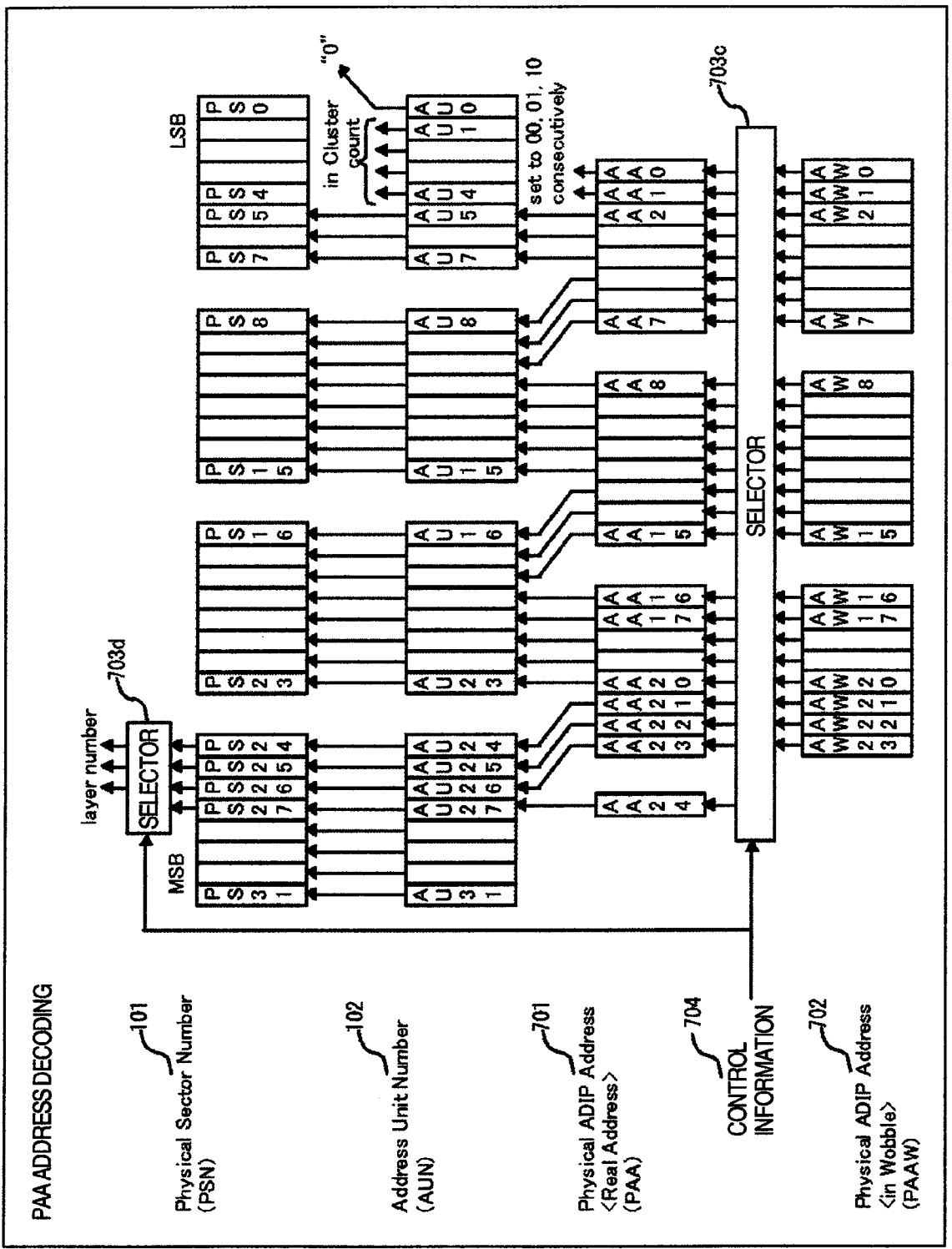
FIG. 12 is an address correlation diagram showing a case in which the address decoding method for the optical disc according to the second embodiment of the invention and the address decoding method for the conventional optical disc are selectively switched.

FIG. 11 shows a switchable address system according to this embodiment for PAAW address generation, and FIG. 12 a switchable address system for PAA address decoding. Both include a control signal 704 for switching between the address system according to the prior art and the address system according to the invention, and a selector 703 controlled by the control signal 704 to switch the encoding or decoding method.

The control signal 704 is for identifying the recording medium corresponding to each of the two different standards and address systems and selecting the proper address system. This signal is normally generated based on the corresponding standard identification information (hereinafter referred to as "the identification information") recorded in the recording media in advance. The information qualified as the identification information for identifying the recording media corresponding to the two different standards are various. The version information, the class information and the disc information of the standard applicable to the optical disc are some examples. Instead of using these information directly, the information obtained indirectly from the information related to them may be used. In short, any information may be used whereby the address system applicable to each recording medium can be established. In the case where the conventional address system is used for the optical disc of one or two layer(s), and the new address system for the optical disc of three or more layers, for example, the information indicating the number of the layers of the optical disc may be used as the identification information.

Now, a third embodiment of the invention is explained.

FIG. 13 is a block diagram showing a recording/reproducing apparatus for reproducing the data from or recording the data to an optical disc produced with the addresses generated as explained above in the first embodiment. Numeral 1201 designates an optical disc, numeral 1202 a optical pickup, numeral 1203 a spindle motor, numeral 1204 an address decoding circuit, numeral 1205 a data recording/reproducing circuit, numeral 1206 a host PC, numeral 1207 a microcomputer for coordinating the whole system operation, numeral 1208 an identification information detection circuit and numeral 1209 an optical disc recording/reproducing apparatus. The wobble signal read, through the optical pickup 1202, from the optical disc 1201 produced according to the address generating method shown in FIG. 1, is input to the address decoding circuit 1204 with the proper address system selected by the control signal generated based on the identification information detected by the identification information detection circuit 1208 thereby to detect the address information. As a result, the address position for data recording/reproduction can be detected, and the data obtained through the optical pickup 1202 and the data recording/reproducing circuit 1205 are exchanged with the host PC 1206, thereby making it possible to input/output the data, i.e. to record/reproduce the data.

FIG. 14 is a flowchart showing the steps of the process according to this embodiment. First, the presence or absence of a recording medium is detected (step (1)). In the presence of the recording medium, the information for identifying the type of the recording medium is detected (step (2)). In the case where the identification information is supported by the apparatus, the address detection system is selected (step (3)). Then, the address is detected (step (4)). Next, the information is recorded in or reproduced from a predetermined address (step (5)).

Following these steps, the information is recorded or reproduced by selecting the proper address processing method and based on the address detection method defined according to the standard applicable to the recording medium.

As described above, the address information bit is embedded in another bit as information, and by restoring the address at the time of detection, the number of bits of the address indicating the physical position can be increased without changing the address structure of the wobble and without increasing the number of bits of the address embedded in the wobble. In this way, the recording capacity per layer can be increased without any considerable change from the conventional address system.

Although the encoding/decoding operation is employed as a method of embedding the information in the embodiments explained above, the present invention is not limited to such a method. Instead, the invention can employ any circuit and/or method in which the information can be embedded and detected using the bit operation based on the presence or absence of the scramble or the difference in scramble regularity.

Also, the invention is not limited to the embodiments described above with regard to the number of bits embedded, the positions at which the embedded bits are arranged, the bit position where the scramble or other information is embedded and the bit structure of the address.

Further, the invention is not limited to the aforementioned embodiments which use the optical disc as a recording medium and the address embedded in the wobble. As an alternative, any concept is similarly applicable as long as the number of bits of the address information read from the disc is reduced as compared with the number of bits of the address generated.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording medium comprising:
   an area for recording a plurality of data, a recording position corresponding to the recording area being indicated by physical address information; and
   a part of the physical address information for indicating the area, less than all of the physical address information, recorded as physical wobble address information in the recording medium, wherein the part of the physical address information is recorded in the recording medium without changing values and regularity of bits in such a manner as to enable restoring of a part of the physical address information not recorded in the recording medium, based on continuity of the least significant two bits forming a portion of the physical wobble address information recorded in the recording medium.

2. An address detection method for a recording medium including an area for recording a plurality of data, a recording position of the area on the recording medium being indicated by physical address information, the address detection method comprising steps of:
   detecting a part of the physical address information recorded in the recording medium as physical wobble address information, wherein the part of the physical address information recorded in the recording medium is less than all of the physical address information, the part of the physical address information having been recorded in the recording medium without changing values and regularity of bits; and
   restoring a part of the physical address information not recorded in the recording medium based on continuity of the least significant two bits forming a portion of the physical wobble address information recorded in the recording medium.

3. A recording apparatus for recording information to a recording medium, the recording medium comprising an area for recording a plurality of data, a recording position corresponding to the recording area being indicated by physical address information, wherein the recording apparatus is configured to perform steps, including steps of:
   detecting a part of the physical address information for indicating the area, less than all of the physical address information, recorded as physical wobble address information in the recording medium, wherein the part of the physical address information is recorded in the recording medium without changing values and regularity of bits in such a manner as to enable restoring of a part of the physical address information not recorded in the recording medium, based on continuity of the least significant two bits forming a portion of the physical wobble address information recorded in the recording medium; and
   recording the information to the recording medium using the physical address information comprising the recorded part and restored part.

4. A reproducing apparatus for reproducing information recorded in a recording medium, the recording medium comprising an area for recording a plurality of data, a recording position corresponding to the recording area being indicated by physical address information, wherein the reproducing apparatus is configured to perform steps, including steps of:
   detecting a part of the physical address information for indicating the area, less than all of the physical address information, recorded as physical wobble address information in the recording medium, wherein the part of the physical address information is recorded in the recording medium without changing values and regularity of bits in such a manner as to enable restoring of a part of the physical address information not recorded in the recording medium, based on continuity of the least significant two bits forming a portion of the physical wobble address information recorded in the recording medium; and
   reproducing the information from the recording medium using the physical address information comprising the recorded part and restored part.

5. A recording method for recording information to a recording medium, the recording medium comprising an area for recording a plurality of data, a recording position corresponding to the recording area being indicated by physical address information, the recording method comprising steps of:
   detecting a part of the physical address information in the recording medium as physical wobble address information, wherein the part of the physical address information recorded in the recording medium is less than all of the physical address information, the part of the physical address information having been recorded in the recording medium without changing values and regularity of bits;
   restoring a part of the physical address information not recorded in the recording medium based on continuity of the least significant two bits forming a portion of the physical wobble address information recorded in the recording medium; and
   recording the information to the recording medium using the physical address information comprising the recorded part and restored part.

6. A reproducing method for reproducing information recorded in a recording medium, the recording medium comprising an area for recording a plurality of data, a recording position corresponding to the recording area being indicated by physical address information, the reproducing method comprising steps of:
   detecting a part of the physical address information recorded in the recording medium as physical wobble address information, wherein the part of the physical address information recorded in the recording medium is less than all of the physical address information, the part of the physical address information having been recorded in the recording medium without changing values and regularity of bits;
   restoring a part of the physical address information not recorded in the recording medium based on continuity of the least significant two bits of the physical wobble address information recorded in the recording medium; and
   reproducing the information from the recording medium using the physical address information comprising the recorded part and restored part.

* * * * *